(12) United States Patent
Lacayo (10) Patent No.: US 9,838,283 B2
(45) Date of Patent: Dec. 5, 2017

(54) TECHNIQUES FOR SYNCHRONIZED ADDRESS CODING AND PRINT SEQUENCING

(71) Applicant: Adolfo Arguello Lacayo, Panama (PA)

(72) Inventor: Adolfo Arguello Lacayo, Panama (PA)

( * ) Notice: Subject to any disclaimer, the term of this patent is extended or adjusted under 35 U.S.C. 154(b) by 293 days.

(21) Appl. No.: 14/678,545

(22) Filed: Apr. 3, 2015

(65) Prior Publication Data

US 2015/0288650 A1 Oct. 8, 2015

Related U.S. Application Data

(60) Provisional application No. 61/975,662, filed on Apr. 4, 2014.

(51) Int. Cl.
*G06F 15/173* (2006.01)
*H04L 12/26* (2006.01)
*G06F 17/30* (2006.01)

(52) U.S. Cl.
CPC ...... *H04L 43/065* (2013.01); *G06F 17/30241* (2013.01)

(58) Field of Classification Search
USPC .................................. 709/224, 200
See application file for complete search history.

(56) References Cited

U.S. PATENT DOCUMENTS

| | | | |
|---|---|---|---|
| 5,420,403 A | 5/1995 | Allum et al. | |
| 5,584,061 A * | 12/1996 | Kimura | H03J 1/0075 455/161.3 |
| 8,817,026 B1 * | 8/2014 | Zimmerman | G06T 1/60 345/426 |
| 2003/0146138 A1 | 8/2003 | Snapp et al. | |
| 2007/0032247 A1 | 2/2007 | Shaffer et al. | |
| 2009/0005900 A1 | 1/2009 | Stemmle | |

(Continued)

OTHER PUBLICATIONS

International Search Report and Written Opinion issued by the U.S. Patent and Trademark Office as International Searching Authority for International Application No. PCT/IB15/01401 dated Jan. 21, 2016 (8 pages).

(Continued)

*Primary Examiner* — El Hadji Sall
(74) *Attorney, Agent, or Firm* — Wilmer Cutler Pickering Hale and Dorr LLP (57) ABSTRACT

Techniques for synchronized address coding and print sequencing are disclosed. In one embodiment, the techniques may be realized as a method for assignment of a geographical based unique address identification code (e.g., a Synchronized ID (SID or Pointer)) to a dwelling or business. The techniques may further include integration of a SID based Master Address Database, SID based search maps and/or the association of a delivery sequence number to one or more SIDs or Pointers. The delivery sequence may contain the route and the delivery sequence within the route. The delivery sequence may thus facilitate the sortation of documents and parcels into the intended delivery sequence at the time of printing the address label or waybill. The descriptive address and delivery sequence associated to a pointer may be obtained via internet from the master address database to be displayed or printed. Thus, the system may avoid stagnant or outdated data.

20 Claims, 6 Drawing Sheets

(56) References Cited

U.S. PATENT DOCUMENTS

2013/0159207 A1  6/2013  Sears et al.

OTHER PUBLICATIONS

Adolfo Arguello Lacayo "Banco General Presentation", Jun. 2013, 24 pages.
Adolfo Arguello Lacayo "Banesco Presentation", Apr. 2013, 48 pages.
Adolfo Arguello Lacayo "Cable and Wireless Presentation", Jun. 14, 2013, 33 pages.
Adolfo Arguello Lacayo "Cable Onda Presentation", Apr. 2013, 29 pages.
Adolfo Arguello Lacayo "Credicorp Bank Presentation", Apr. 12, 2013, 37 pages.
Adolfo Arguello Lacayo "Group Tax Collection Presentation", Jun. 2012, 28 pages.
Adolfo Arguello Lacayo "S2 Alico Insurance Presentation", Mar. 11, 2011, 27 pages.
Adolfo Arguello Lacayo "St Georges Bank Presentation", Jun. 2013, 29 pages.
Adolfo Arguello Lacayo "Union Fenosa Presentation", Oct. 3, 2011, 38 pages.

* cited by examiner

| Street | Round | Sequence | FloorIDX | Site | Name | HouseNo | Floor | AptNo |
|---|---|---|---|---|---|---|---|---|
| Calle LA ALAMEDA | AAA | 10 | 3 | 88IF100PD | LA CANASTILLA IDEAL | 42 | PB | 01 |
| Calle LA ALAMEDA | AAA | 20 | 3 | 88IF100TC | CASA 43 | 43 | PB | 01 |
| Calle LA ALAMEDA Y Avenida 47 | AAA | 30 | 6 | 88IG099QI | EDIFICIO BAHIA ESMERALDA | | 05 | 01 |
| Calle 50 ESTE | AAA | 40 | 3 | 88IG099XD | CONDOMINIO ALFIL | | PB | 01 |
| Calle 50 ESTE | AAA | 40 | 3 | 88IG099XD | CONDOMINIO ALFIL | | PB | 02 |
| Calle 50 ESTE | AAA | 50 | 3 | 88IH099EL | SALA DE BELLEZA IMAGE | G-11 | PB | 01 |
| Calle 50 ESTE | AAA | 60 | 3 | 88IH099HN | THE ROSE BOUTIQUE | 12-F | PB | 01 |
| Calle 50 ESTE | AAA | 70 | 3 | 88IH099MS | ALMACEN PAMELA HILL | 14 | PB | 01 |
| Calle 50 ESTE Y Avenida 47 | AAA | 80 | 3 | 88IH100QG | GALERIAS MAR PLAZA | | PB | 04 |
| Calle 50 ESTE Y Avenida 47 | AAA | 80 | 3 | 88IH100QG | GALERIAS MAR PLAZA | | PB | 05 |
| Calle 50 ESTE Y Avenida 47 | AAA | 80 | 3 | 88IH100QG | GALERIAS MAR PLAZA | | PB | 01 |
| Calle 50 ESTE Y Avenida 47 | AAA | 80 | 3 | 88IH100QG | GALERIAS MAR PLAZA | | PB | 08 |
| Calle 50 ESTE Y Avenida 47 | AAA | 80 | 3 | 88IH100QG | GALERIAS MAR PLAZA | | PB | 09 |
| Calle 50 ESTE Y Avenida 47 | AAA | 80 | 3 | 88IH100QG | GALERIAS MAR PLAZA | | PB | 12 |
| Calle 50 ESTE Y Avenida 47 | AAA | 80 | 3 | 88IH100QG | GALERIAS MAR PLAZA | | PB | 06 |
| Calle 50 ESTE Y Avenida 47 | AAA | 80 | 3 | 88IH100QG | GALERIAS MAR PLAZA | | PB | 02 |
| Calle 50 ESTE Y Avenida 47 | AAA | 80 | 3 | 88IH100QG | GALERIAS MAR PLAZA | | PB | 07 |
| Avenida 47 | AAA | 90 | 6 | 88IH100HI | CONDOMINIO BRISAS MARBELLA | | 04 | 02 |
| Avenida 47 | AAA | 90 | 6 | 88IH100HI | CONDOMINIO BRISAS MARBELLA | | 04 | 01 |
| Avenida 47 | AAA | 100 | 3 | 88IG099QQ | CONDOMINIO GIRASOL | | PB | 01 |
| Calle 50 D ESTE Y Avenida 47 | AAA | 110 | 3 | 88IG099JZ | CONDOMINIO PRINCESS | | PB | 01 |
| Calle 50 D ESTE | AAA | 120 | 3 | 88IG100NO | CONDOMINIO VILLA REGINA | | PB | 01 |
| Calle 50 D ESTE | AAA | 130 | 3 | 88IF100UN | ABL PHARMA | 34 | PB | 01 |
| Calle 50 D ESTE | AAA | 140 | 3 | 88IF101XO | EMBAJADA DE TAILANDIA | 5-A | PB | 01 |
| Calle 50 D ESTE | AAA | 150 | 3 | 88IF101VF | HOTEL RIU PANAMA | | PB | 01 |
| Calle 50 D ESTE | AAA | 160 | 3 | 88IF101SH | EDIFICIO C | 7 | PB | 01 |

Fig. 6

TECHNIQUES FOR SYNCHRONIZED ADDRESS CODING AND PRINT SEQUENCING

CROSS-REFERENCE TO RELATED APPLICATIONS

This patent application claims priority to U.S. Provisional Patent Application No. 61/975,662, filed Apr. 4, 2014, which is hereby incorporated by reference herein in its entirety.

FIELD OF THE DISCLOSURE

The present disclosure relates generally to assignment of a geographical based unique address identification code to addresses and, more particularly, to techniques for applying such unique address identification codes in geographical locations lacking structured address systems.

BACKGROUND OF THE DISCLOSURE

Over two thirds of the world's population live in areas that lack a structured addressing system. Traditional address systems require several fields to identify a unique address (street name, street number, street type, city state zip code) and have proven difficult to update and maintain as cities grow and political boundaries are redrawn. Furthermore, the lack of a unique address key has impeded the electronic updates of addresses to end-users. Given the amount of data required to define an address, address information is not ideal for the digital world. An address requires at a minimum street name, number, city, state, and zip code.

Additionally, developing countries that have lapsed or have poor addressing systems may have little or no access to modern localized services and substandard postal/parcel delivery. This affects not only personal communications, but also business and government communications. Government services such as property permitting services, tax administration and collection, school districting, health system managements, trash collection and emergency services also suffer from poor addressing systems. Finally the lack of proper addressing system also hinders proper census and further penetration of financial and other services to mid to lower income people.

In view of the foregoing, it may be understood that there may be significant problems and shortcomings associated with current structured addressing technologies.

SUMMARY OF THE DISCLOSURE

Techniques for synchronized address coding and print sequencing are disclosed. In one particular embodiment, the techniques may be realized as a method for assignment of a geographical based unique address identification code (e.g., a Synchronized ID (SID or Pointer)) to a dwelling or business. The techniques may further include integration of a SID based Master Address Database, SID based search maps and/or the association of a delivery sequence number to one or more SIDs or Pointers. The delivery sequence may contain the route and the delivery sequence within the route. The delivery sequence may thus facilitate the sortation of documents and parcels into the intended delivery sequence at the time of printing the address label or waybill. The descriptive address and delivery sequence associated to a pointer may be obtained via internet from the master address database to be displayed or printed. Thus, the system may avoid stagnant or outdated data.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 6 shows an index sequence file in accordance with an embodiment of the present disclosure.

DETAILED DESCRIPTION OF EMBODIMENTS

Figure 1:
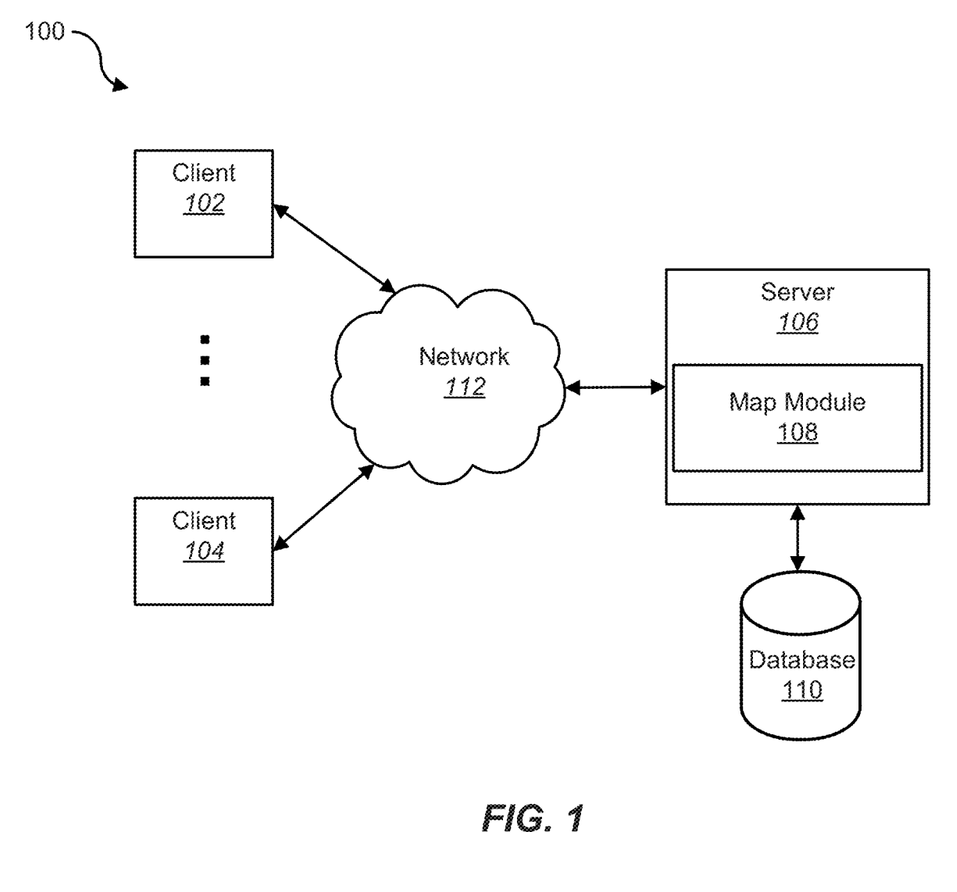
FIG. 1 shows a block network diagram in accordance with an embodiment of the present disclosure.

FIG. 1 shows a block network diagram in accordance with an embodiment of the present disclosure. FIG. 1 is a simplified view of network architecture 100, which may include additional elements that are not depicted. Network architecture 100 may contain client systems 102 and 104, as well as server 106. Client systems 102 and 104 may be communicatively coupled to a network 112. Server 106 may also be communicatively coupled to network 112. Server 106 may contain a map module 108. Server 106 may be communicatively coupled to database 110.

Network 112 may be a local area network (LAN), wide area network (WAN), the Internet, a cellular network, a satellite network, or another network that permits communication between clients 102 and 104, server 106, database 110, and other devices communicatively coupled to network 112. Network 112 may further include one, or any number, of the types of networks mentioned above operating as a stand-alone network or in cooperation with each other. Although networks 112 is depicted as one network, it should be appreciated that according to one or more embodiments, network 112 may comprise a plurality of interconnected networks.

Map module 108 may contain stored logic (e.g., non-transitory instructions) for implementing one or more portions of functionality described herein. Map module 108 may be implemented as computing software, firmware, hardware, and/or various combinations thereof. Map module 108, however, is not to be interpreted as software which is not implemented on hardware, firmware, or recorded on a processor readable recordable storage medium (i.e., modules are not software per se). It is noted that Map module 108 is just one of multiple possible embodiments. Map module 108 may be combined, integrated, separated, and/or duplicated to support various applications. Although depicted on a single server, map module 108 may be distributed across multiple servers, across one or more clients, one or more network elements (e.g., a router or a gateway), or a combination of the foregoing.

According to some embodiments, database 110 may be a geo-spatial address database. Database 110 may store, for example, address data, allocation grid series, grid allocation cells, SID components, sub-dwelling data, SID based search maps, the association of a delivery sequence number to one or more SIDs or Pointers, delivery sequences, index sequence files, geo-location data, client information, account information, traditional address elements (e.g., a building's name, building's number, a sub address descriptor, business name, owner, street name and type, district or region, etc.), and geo-location data.

Techniques for synchronized address identification coding and print sequencing may provide a coordinates based and centralized addressing system that allows improved efficiency for: the establishment of new address and management of cities; address maintenance; and postal and parcel delivery and as well a series of important localized services. This is especially relevant for developing countries that have lapsed or poor addressing systems, no access to modern localized services and/or substandard postal/parcel delivery, because it allows such countries to leapfrog to a modern and efficient addressing system. Government can further benefit from localized government services such as, for example: the implementation of a modern addressing system in the management of property permits, tax administration and collection, school districting, health management, emergency services, utility services, accurate census trash collection and the further penetration of financial and other services to mid to lower income people.

Techniques for synchronized address identification coding and print sequencing may be considered in two parts. The following chart contains terms used below to describe embodiments of the techniques.

| Element | Embodiment |
| --- | --- |
| SID or Pointer (Synchronized code assigned to a building) | This is the name given to the address identifier that is generated from the grid system that overlays a target area |
| SID Allocation grids | A grid may contains, for example, 100 meter square that covers a target area and has cells named by the progression along the x and y axis in the format aa - 999 the ranges are as follows:<br>X-axis aa-zz<br>Y-axis 000-999 |
| Address Object | Either a point or a polygon that represents a dwelling or building. |
| Delivery Rounds | Collection of Address objects that can be grouped together to form a logical group to facilitate delivery |
| Sub-Dwelling | An apartment, unit, business or offices that may exist as a separate entity with a structure that is assigned an SID |
| Sequence | The order in which mail delivery may be achieved. |
| Sequence Index | A character based reference that may use the ASCII ascending progression to create an index for each delivery round. |

Part one is the assignment of a geographical based unique address identification code denominated Synchronized ID (SID or Pointer) to one or more dwellings or businesses.

Part two is the integration of an SID based Master Address Database, SID based search maps, and the association of a delivery sequence number to one or more SIDs or Pointers. The delivery sequence can contain the route and the delivery sequence within the route. Thus, the delivery sequence may facilitate sortation of documents and parcel into an intended delivery sequence at the time of printing the address label or waybill. The descriptive address and delivery sequence associated to a pointer may be obtained via internet from the master address database when it needs to be displayed or printed. This may avoid the use of outdated or stagnant data.

The two parts of the techniques for synchronized address identification coding and print sequencing are described at a high level below and in more detail in following sections.

Part One: Assignment of the Synchronized Address Identification Code (SID)

The fundamental approach to assigning the SID code may include building a geo-spatial address database that allows the assignment of an identifier to map objects representing buildings and homes.

The method of creation of the database may include, for the target area (geographical area such as zone, city, state or country):

1. Obtaining a spatial dataset that has property information contained as geographical address objects (such as buildings);
2. Validating those objects and incorporate at a minimum building related information, existing street data and political division data;
3. Using SID Allocation Grids assign a unique SID to each building and in turn to each separate dwelling within the building.

Since the SID or Pointer is based on a coordinates based algorithm it can be easily calculated in any GPS enabled equipment such as, for example, a phone—provided that the phone contains or receives the algorithm and data for calculating. Once a person obtains the correct SID or Pointer it is easy to obtain the descriptive address from the Master Address Database (e.g., via a secure network connection).

Part Two: Integration of SID Based Master Address Database, Search Maps & Print Sequencing for Delivery The Master Address Database may be built around the SID or Pointer. Thus, once a building is assigned a pointer it may be possible to associate multiple building names or street names to each building to facilitate the search of a specific building in search maps. It may also be possible to define a specific building name/number or street name/number as the primary or official address without giving up the capability of having multiple alternate addresses. In addition to street address information the database may also contains specific building information, building sub-dwelling information, residents information, geospatial information, delivery information, political division and any pertinent information that can be connected via the pointer.

Given the existence of a pointer-based master address database, the address database of end users (private or public) may only need to store the pointer and sub dwelling information in their databases. Any other address related information such as a descriptive address may be obtained from the Master Address Database, as it is needed. The centralization of address information based on a geo-referenced pointer may facilitate access to updated information at levels unattainable with existing address schemes.

Once a SID has a print sequence associated to it that defines the routes and delivery sequence with each route, the sequence is incorporated into the Master Address Database. Thus, by embedding the address code (SID) directly from the Master Address database, into the sending customers address, it may be possible to sort the documents to be mailed prior to printing in the sequence required for delivery. Consequently, it may no longer be necessary to incur the expensive, and capital intensive process of using optical scanners to read the printed address of the envelopes and sorting the letters. In the case of parcels, the Waybill may include a barcode with the Pointer (Address ID) and delivery sequence. Thus, the barcode and pointer may simplify the reading of the address and sorting to the parcels.

Finally, since the each SID or Pointer is geo-referenced, it may facilitate the implementation of the latest localized technology even in countries that lack updated and structured addresses.

The techniques for synchronized address identification coding and print sequencing provide unique way in which the property is addressed and a unique method by which this addressing component is stored in a Master Address Database and is linked with a sequenced delivery file to enable automatic sequencing at the time of printing the address or the parcel waybill. The full benefit of this development may be attained in places that lack a formal addressing system, through the introduction of a new addressing system designed for the digital age and capable of taking full advantage of existing technology.

Detailed Description of Part One: Assignment of the Synchronized Address Identification Code (SID)

Figure 2:
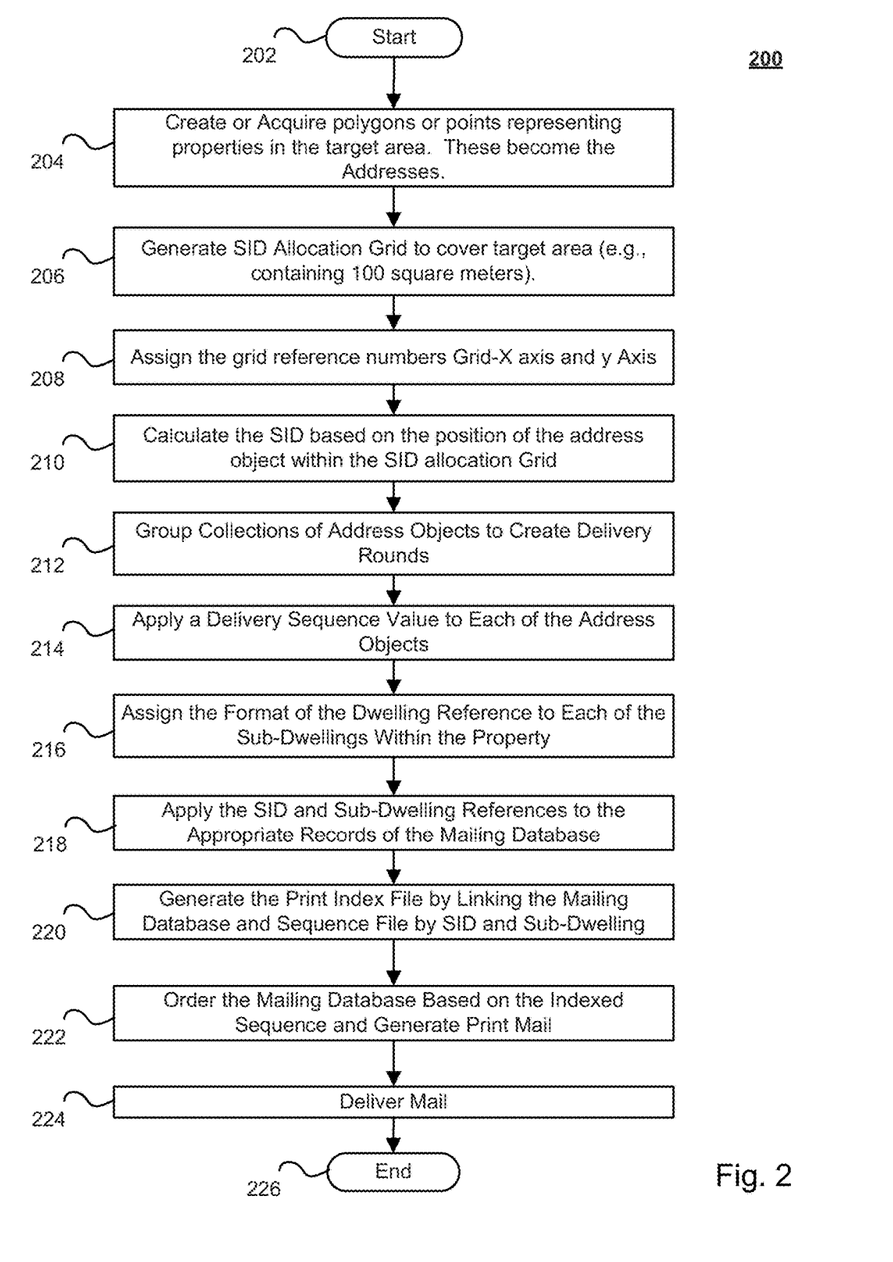
FIG. 2 depicts a flow chart in accordance with an embodiment of the present disclosure.

Turning to FIG. 2, there is depicted a flow chart of a method 200 in accordance with an embodiment of the present disclosure. Method 200 may begin at step 200.

At step 204, a geo-spatial map database representing buildings and houses in the target area may be built. The base data for this step (e.g., polygons or points) may be either acquired or created by field visits. This data forms the database address objects. Information assigned to each address object may include (where available) traditional address elements such as a building's name, building's number, a sub address descriptor, business name, owner, street name and type, district or region.

At step 206, a SID allocation GRID (e.g., a geometric grid series, using, for example and without limitation, cells of 100 meters by 100 meters to cover the target area) may be generated. In that example, the extent of each grid series can be 62.5 kilometers on the X-axis and 99.9 kilometers on the Y-axis. More than one grid series may be required covering a target area.

Figure 3:
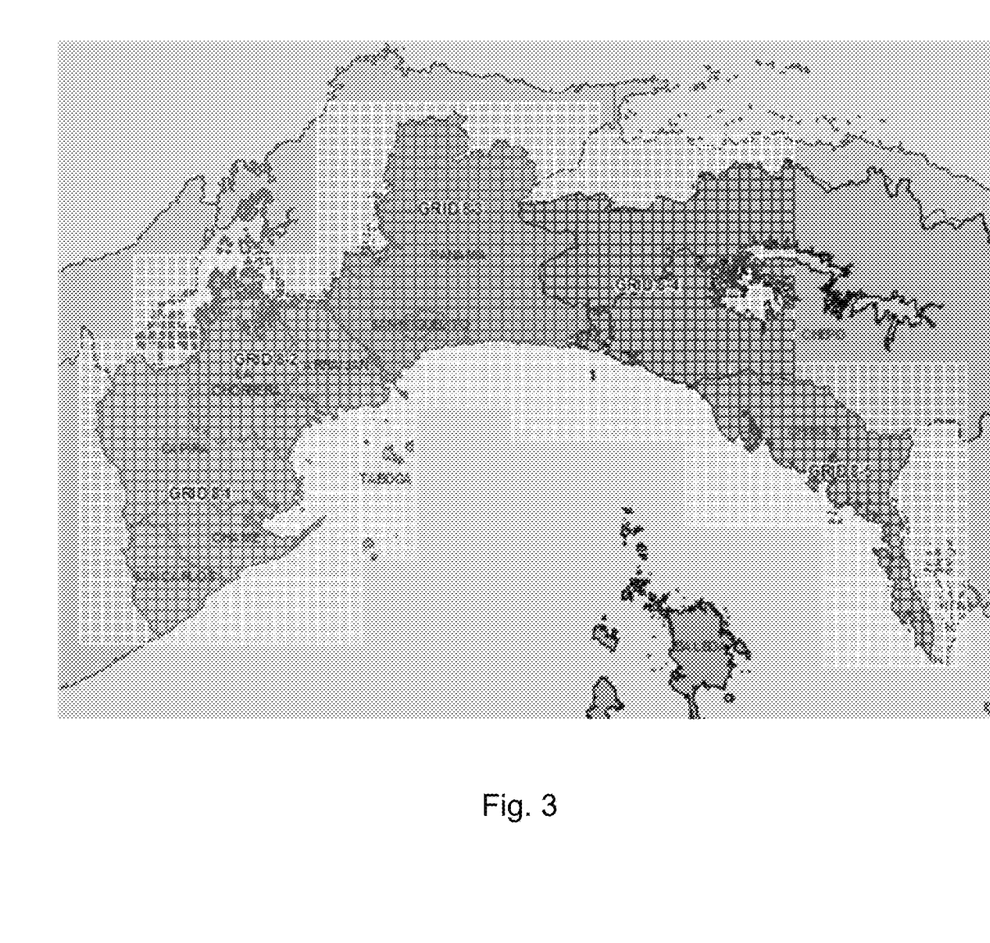
FIG. 3 shows a map having an allocation grid series in accordance with an embodiment of the present disclosure.

An SID Allocation Grid Series for Panama District, Panama is depicted in FIG. 3.

Returning to FIG. 2, at step 208, grid allocation series and cells may be numbered. Each grid series may be numbered using a numeric field, for example and without limitation, two digits (NN). Grids may be aligned in such a way to cover an entire city, district, state or province, depending upon the political division and extension of each individual country. The cells within each grid series may also be numbered. For example, in some embodiments, numbering may start at the bottom left-most cell (the origin) and may use the following structure:

Two Alpha characters starting AA may be used to reference cells along the x axis;

Three numbers (NNN), stating at 000, may be used to reference cells along the y axis.

At step 210, the SID may be calculated based on the position of the address object within the SID allocation cell. The SID can then be applied geographically to one or more address objects as defined by its position within the grid:

Since each building may have a corresponding polygon as the address object, a point object may be created within the polygon for addressing purposes. This object can be the centroid of the polygon or at a position to represent a feature such as a main access way. Thus, the cell containing the centroid or desired building point, may become the building SID.

In the present example to identify the address cell, the remaining two characters of the SID (following the cell reference) may be allocated based on the position of the address cell within the 100 m by 100 m grid cell. Again, the character allocation may be based, for example, on the linear distance of the cell from the origin of the grid cell West to East and South to North.

In this detailed allocation, a discrete and fixed progression, such as, for example, one having 4 meter on the x axis and 4 meter progressions on the y axis, may be used. Thus, each of the subsequent increments of 4.0 m, along either axis may be assigned a letter sequentially from A to Y.

The use of the address of an small area to locate an object address, such as, for example and without limitation, 4 m×4 m, instead of a specific coordinate, may facilitate creation of a code small enough to allow its memorization by residents (e.g., a total of seven digits instead of sixteen).

In this embodiment, the "z" character is retired unless needed to resolve conflict. Where there is a conflict the z character may be used (e.g., if there are two buildings completely contained in the same 4 meter square, a z character may be assigned to one of them).

Figure 4:
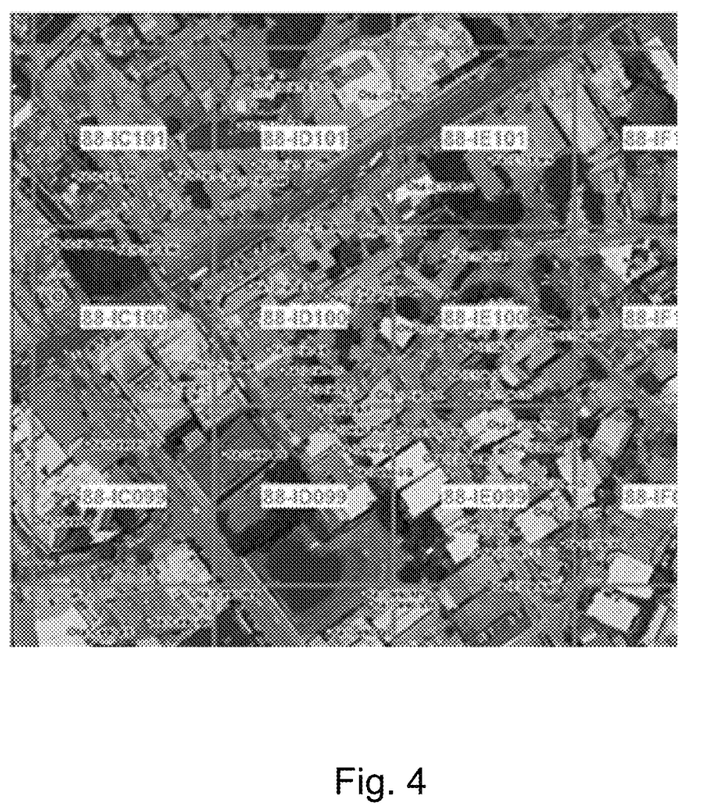
FIG. 4 shows grid allocation cells and SID components in accordance with an embodiment of the present disclosure.

A grid with 100 meter allocation cells and SID components is depicted in FIG. 4.

For each address object, any sub dwelling or apartment information within the building may also be provided with a unique reference, called the SID Suffix. To provide context, the floor and apartment numbers may also be used.

TABLE 1

SID Suffixes

| SID | | |
| --- | --- | --- |
| Grid series | X, Y and position within grid | Suffix |
| 88- | IK092-CK- | L2-1 |
| 88- | IK092-CK- | L3-2 |
| 88- | IK092-CK- | L4-3 |
| 88- | IK092-CK- | L5-4 |
| 88- | IK092-CK- | L6-5 |
| 88- | IK092-CK- | L7-6 |
| 88- | IK092-CK- | L8-7 |
| 88- | IK092-CK- | L9-8 |
| 88- | IK092-CK- | L10-9 |
| 88- | IK092-CK- | L11-10 |

TABLE 2

Summarized SID Numbering System Structure

| Position | n | n | a | a | n | n | n | a | a | suffix |
|---|---|---|---|---|---|---|---|---|---|---|
| Description | Two numbers, referencing the main SID grid series | | Two alpha characters starting at AA and used to reference cells along the x axis | | Three numbers starting at 000 and used to reference cells along the y axis | | | Two alpha characters used to denote the address position within the 100 m grid cell. | | Apartment or sub dwelling reference used when needed, shown as SID suffix |

Returning to FIG. 2, at step 212, collections of address objects may be grouped to create delivery rounds. Target area address objects may be divided up into manageable blocks called delivery rounds (the size may be dependent on the density of the dwellings and the mode of transport for mail delivery purposes).

In some embodiments, each address object may be assigned a 3 character round descriptor (aaa).

At step 214, a delivery round sequence value may be applied to one or more address objects. Taking into account the road and transportation requirements, one or more address objects within a round may then be assigned a sequence number (e.g., the order in which delivery would occur). According to some embodiments, the sequence number may be a 3 number (nnn) field, which may facilitate any required insertions at the time of delivery increments in steps of 10. However, it must be noted that an advantage of a pointer based centralized addressing system is that any information associated to an SID or Pointer can be updated overnight or over a holiday. The end user only need to store in their systems the POINTER, all other associated information may be accessed from the Master Address Database as needed to display or print (e.g., in real time).

At step 216, the format of the dwelling reference may be assigned to one or more of the sub-dwellings within a property. Sub-dwellings within a single property may have the same SID, thus the suffix described in step 210 above may be sorted (e.g., based on floor level and location of the sub-dwelling within the floor), to facilitate an efficient delivery with buildings. This is more relevant when considering the absence of mailboxes in some buildings. One or more referential attributes of the building may be associated to the sub-dwellings.

Detailed Description of Part Two: Integration of SID Based Master Address Database, Search Maps & Print Sequencing for Delivery At step 218, the SID and sub-dwelling reference may be applied to one or more records of the mailing database. One or more buildings and SID/Pointers may be created based on a geographic location. A SID may also be associated to one or more portions of existing address information such as building name or number, street names(s), commercial establishments and inventory of units and respective level in the case of buildings. Delivery route and sequence files may be created and associated to one or more SIDs.

At step 220, a print index file may be generated by linking the mailing database and sequence file by SID and sub-dwelling. To facilitate the integration and widespread use of the SID/Pointer, search maps may be created for the general population and to allow address searches from within other applications (e.g., business and government applications). The search may be done based on any known address information including building name and commercial establishments within building. Predictive text and maps may allow the precise identification of the desired location. Once a location is approved the Address ID may be passed to the requesting Customer Database. The sequence index file may be generated for each SID and supplied as the print order so that the mail may be sorted, prior to printing in the exact sequence needed for delivery. This process may reduce the need for expensive sorting equipment used in traditional postal services based on a descriptive address (Street number and name) In the case of Parcels, the Waybill may include a barcode with the Pointer and delivery sequence obtained from the Master Address Database), thus simplifying the reading of the address and sorting to the parcels At step 222, the mailing database may be ordered based on the indexed sequence and print mail may be generated. This may incorporate address and delivery sequence into deliveries of documents or Parcels. The relevant destination SID (e.g., the "send to" SID) may be matched against an address record in the Master Address Database. The descriptive address and the delivery sequence may be attached to the send to SID. The address label or waybill is printed incorporating the SID/POINTER, descriptive address and delivery sequence. Physical mail may be printed in the order dictated. Mail is provided for delivery in this order, thus reducing the need for expensive optical character readers/sorters that postal services around the world depend on.

At step 224, mail may be delivered.

TABLE 3

Sequence Index File - Structure definition

| Field | Description |
|---|---|
| Round | The name of the collection of dwellings that are grouped together to form a round |
| Sequence | The order in which the delivery would be made and the key used to sequence the print run so that the that the mail is effectively sorted at the time of creation |
| FloorNDX | Is an index value applied to each standard floor descriptor, this is used to ensure that mail is not only sequenced in round order but in floor and apartment order should there be multiple dwellings or businesses within a building or complex |
| SID | The id assigned to the house building or complex |
| Name | Name of the building if one exists |
| House No | Number of the building if one exists |
| Floor | The standard descriptor of the floor |
| Apt No | The number of the apartment |
| Street | The name of the street from which access to the building is gained |

Synchronized Address Code:

The SID/POINTER is an efficient and well-structured address code that can be easily digitalized and may not require the existence of government assigned street numbers and/or names.

The Pointer is based on coordinates and may be calculated on a GPS based phone or hand held unit using, for example, a provided algorithm and data.

A Master Address Database may provide a normalized and updated descriptive address each time.

Provides businesses with knowledge of customers' locations, especially in countries that lack a structured addressing system.

Reduces addressing errors associated with incomplete or misspelled descriptive addresses.

Allows for the creation of an alternative address scheme capable of working in tandem with imperfect and incomplete traditional descriptive address schemes.

Provides a private sector solution to addresses long neglected addressing systems by governments around the world.

Simplifies the implementation and upgrading of government dependent descriptive addressing systems Makes possible the implementation of a location based secure digital mail (SID could be used to drive physical deliveries as well as a secure digital address such as SID@Sincronizate.net), thus simplifying the use integration of multiple channels of communications Synchronized Address Code with Print Sequence:

Allows for the incorporation of a print sequence to an address for consolidated letter delivery.

Eliminates the need for expensive optical character reader and sorting equipment.

Streamlines and reduces the cost of consolidating mail for delivery.

Figure 5:
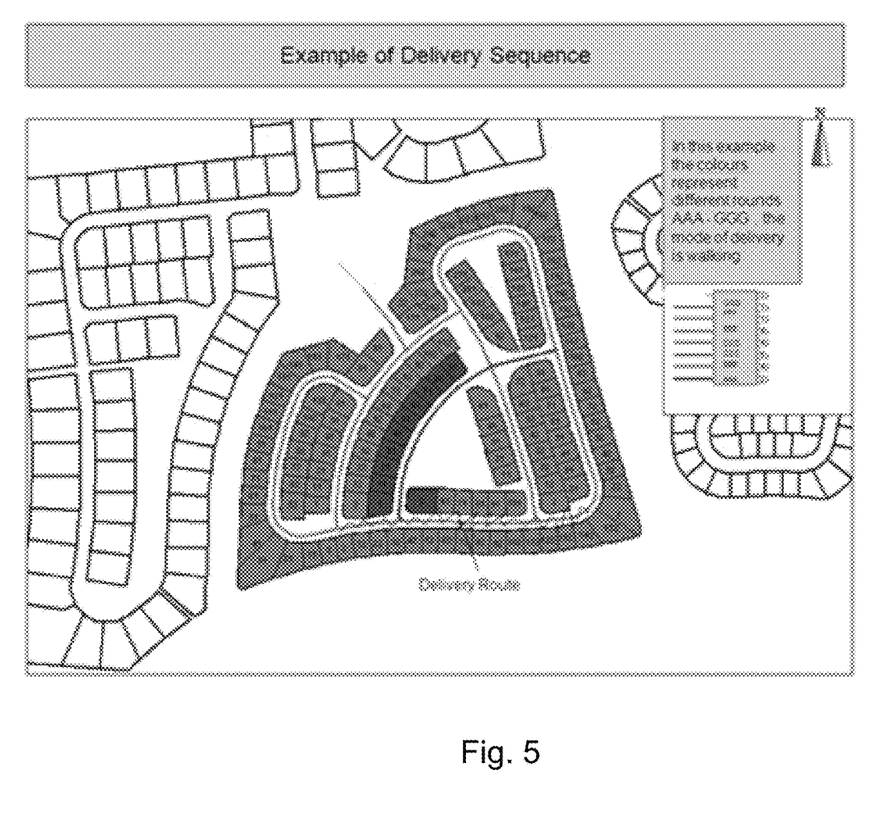
FIG. 5 depicts a delivery sequence in accordance with an embodiment of the present disclosure.

FIG. 5 depicts a delivery sequence in accordance with an embodiment of the present disclosure. As depicted in FIG. 5, according to some embodiments, multiple rounds of delivery sequences may be mapped to a delivery mode (e.g., walking)

FIG. 6 shows an index sequence file in accordance with an embodiment of the present disclosure. The index sequence file may contain one or more elements such as, for example, street, round, sequence, floor, SID, name, house number, floor index, and apartment number.

At this point it should be noted that techniques for synchronized address coding and print sequencing in accordance with the present disclosure as described above may involve the processing of input data and the generation of output data to some extent. This input data processing and output data generation may be implemented in hardware or software. For example, specific electronic components may be employed in a server or similar or related circuitry for implementing the functions associated with synchronized address coding and print sequencing in accordance with the present disclosure as described above. Alternatively, one or more processors operating in accordance with instructions may implement the functions associated synchronized address coding and print sequencing in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method for assignment of a geographically based unique address identification code to a delivery location comprising:

generating an address identification code assignment grid for a specified delivery region, wherein the grid is subdivided by x-axis and y-axis partitions;

identifying, using a database containing geographical features representing the specified delivery region, a geographical feature associated with the delivery location;

generating an address identification code for the delivery location wherein generation of the address identification code comprises:

determining a identification code for the address identification code assignment grid as a first part of the address identification code;

determining an x-axis identifier associated with the identified geographical feature as a second part of the address identification code;

determining an y-axis identifier associated with the identified geographical feature as a third part of the address identification code;

determining whether an address identification code suffix is required; and in the event an address identification code suffix is required, determining the address identification code suffix as a fourth part of the address identification code.

2. The method of claim 1, further comprising:
validating the geographical objects in the database.

3. The method of claim 1, wherein the delivery location comprises at least one of: a dwelling and a business address.

4. The method of claim 1, wherein identifying, using a database containing geographical features representing the specified delivery region, a geographical feature associated with the delivery location comprises identifying a geographical point associated with the delivery location.

5. The method of claim 1, wherein identifying, using a database containing geographical features representing the specified delivery region, a geographical feature associated with the delivery location comprises identifying a polygon associated with the delivery location.

6. The method of claim 1, wherein the grid which is subdivided by x-axis and y-axis partitions comprises a grid subdivided into rectangular cells.

7. The method of claim 1, wherein determining whether an address identification code suffix is required is based at least in part on a determination of whether more than one delivery location is located within a single grid subdivision.

8. The method of claim 1, wherein determining whether an address identification code suffix is required is based at least in part on a type of delivery location.

9. The method of claim 8, wherein in the event the type of location includes a multi-tenant residence an address identification code suffix is required.

10. The method of claim 1, wherein the address identification code suffix comprises sub dwelling information.

11. The method of claim 10, wherein the address identification code suffix comprises at least one of: a floor number and an apartment number.

12. The method of claim 1, wherein the database includes additional information associated with the geographical feature including at least one of: building related information, street data, political division data, building sub-dwelling information, resident information, geospatial information, delivery information, business name, owner, district, and region.

13. The method of claim 1, further comprising assigning a delivery sequence number to one or more unique address identification codes.

14. The method of claim 1, further comprising providing an interface to the database to allow searching by a unique address identification code.

15. The method of claim 14, wherein searching by a unique address identification code is configured to return one or more matching search results containing at least one of: building related information, street data, political division data, building sub-dwelling information, resident information, geospatial information, delivery information, business name, owner, district, and region.

16. The method of claim 14, wherein searching by a unique address identification code is configured to return directions to a delivery location associated with the unique address identification code.

17. The method of claim 14, further comprising:
providing a unique address identification code to a mobile device;
receiving a database query using the unique address identification code; and
providing location data associated with the unique address identification code.

18. At least one processor readable storage medium storing a computer program of instructions configured to be readable by at least one processor for instructing the at least one processor to execute a computer process for performing the method as recited in claim 1.

19. An article of manufacture for assignment of a geographically based unique address identification code to a delivery location, the article of manufacture comprising:
at least one non-transitory processor readable storage medium; and
instructions stored on the at least one non-transitory processor readable storage medium;
wherein the instructions are configured to be readable from the at least one non-transitory processor readable storage medium by at least one processor and thereby cause the at least one processor to operate so as to:
generate an address identification code assignment grid for a specified delivery region, wherein the grid is subdivided by x-axis and y-axis partitions;
identify, using a database containing geographical features representing the specified delivery region, a geographical feature associated with the delivery location;
generate an address identification code for the delivery location wherein generation of the address identification code comprises:
determining a identification code for the address identification code assignment grid as a first part of the address identification code;
determining an x-axis identifier associated with the identified geographical feature as a second part of the address identification code;
determining an y-axis identifier associated with the identified geographical feature as a third part of the address identification code;
determining whether an address identification code suffix is required; and
in the event an address identification code suffix is required, determining the address identification code suffix as a fourth part of the address identification code.

20. A system for assignment of a geographically based unique address identification code to a delivery location, the system comprising:
at least one processor configured to:
generate an address identification code assignment grid for a specified delivery region, wherein the grid is subdivided by x-axis and y-axis partitions;
identify, using a database containing geographical features representing the specified delivery region, a geographical feature associated with the delivery location;
generate an address identification code for the delivery location wherein generation of the address identification code comprises:
determining a identification code for the address identification code assignment grid as a first part of the address identification code;
determining an x-axis identifier associated with the identified geographical feature as a second part of the address identification code;
determining an y-axis identifier associated with the identified geographical feature as a third part of the address identification code;
determining whether an address identification code suffix is required; and
in the event an address identification code suffix is required, determining the address identification code suffix as a fourth part of the address identification code; and
at least one memory, coupled to the at least one processor, configured to provide the at least one processor with instructions.

* * * * *